(12) United States Patent
Habedank

(10) Patent No.: US 7,137,667 B2
(45) Date of Patent: Nov. 21, 2006

(54) VEHICLE SEAT AND ITS APPLICATION TO A REAR SEAT

(75) Inventor: Klaus-Dieter Habedank, Stadthagen (DE)

(73) Assignee: Faurecia Autositze GmbH & Co.KG (DE)

( * ) Notice: Subject to any disclaimer, the term of this patent is extended or adjusted under 35 U.S.C. 154(b) by 373 days.

(21) Appl. No.: 10/727,405

(22) Filed: Dec. 4, 2003

(65) Prior Publication Data

US 2004/0108765 A1  Jun. 10, 2004

(30) Foreign Application Priority Data

Dec. 4, 2002  (DE) ................. 102 56 514

(51) Int. Cl.
*B60N 2/02* (2006.01)

(52) U.S. Cl. ................. 297/378.12; 297/344.1
(58) Field of Classification Search ........... 297/378.12, 297/344.1; 296/65.13, 65.14, 65.16

See application file for complete search history.

(56) References Cited

U.S. PATENT DOCUMENTS

| | | | | |
|---|---|---|---|---|
| 6,152,533 A | * | 11/2000 | Smuk ................. | 297/341 |
| 6,336,679 B1 | * | 1/2002 | Smuk ................. | 297/378.12 |
| 6,347,834 B1 | | 2/2002 | Couasnon ............ | 297/341 |
| 6,371,558 B1 | * | 4/2002 | Couasnon ............ | 297/378.1 |
| 6,827,404 B1 | * | 12/2004 | Blair et al. ........... | 297/378.12 |
| 6,926,364 B1 | * | 8/2005 | Cooley et al. ........ | 297/378.12 |

FOREIGN PATENT DOCUMENTS

| | | |
|---|---|---|
| DE | 694 06 157 T2 | 3/1993 |
| DE | 199 62 424 C1 | 12/1999 |
| DE | 100 55 432 A1 | 11/2000 |
| EP | 0614 781 B1 | 10/1997 |

* cited by examiner

*Primary Examiner*—Peter M. Cuomo
*Assistant Examiner*—Tania Abraham
(74) *Attorney, Agent, or Firm*—Synnestvedt Lechner & Woodridge LLP

(57) ABSTRACT

The invention relates to a motor vehicle seat, in particular a rear row of seats of a motor vehicle, that is displaceable between a seat position and a functional position, having a seat part (3) adjustable relative to a seat frame (2), a back rest (4) foldable relative to the seat part, a front handle (11) for unlocking a seat longitudinal locking unit (8) of the seat part (3), a handle (24) operated from a rear position of the back rest (4), by means of which the seat longitudinal locking (8) of the seat part (3) can be unlatched; it is possible to check, whether the seat part (3) is in a rear position; if the seat part (3) is in the rear position, a rest blocking unit of the back rest (4) can be released. According to the invention, a simple displacement of the motor vehicle seat, in particular also from the rear side, is achieved.

12 Claims, 10 Drawing Sheets

VEHICLE SEAT AND ITS APPLICATION TO A REAR SEAT

CROSS REFERENCE TO RELATED APPLICATIONS

This application claims the priority of German Application No. 102 56 514.7-14, filed on Dec. 4, 2002, the entire contents and substance of which are hereby incorporated in total by reference.

FIELD OF THE INVENTION

The invention relates to a motor vehicle seat, in particular for a rear row of seats of the motor vehicle, which can be adjusted between a sitting position and a functional position.

BACKGROUND OF THE INVENTION

In the aforementioned type of longitudinally displaceable motor vehicle seat of a rear, in particular second or third seat row the functional position can used with the essentially horizontal rear support foldable forward as a table support or for extending a cargo space situated behind it, for example. If the motor vehicle seat, however, is in a forward position time of the folding movement, its headrest can collide with a seat situated in front of it and possibly be damaged.

DE 199 66 242 C1 discloses a motor vehicle seat with a seat frame that is longitudinally adjustable vis-à-vis a lower rail that is integral with the motor vehicle. A back rest is foldable hinged to the seat frame and secured by means of back rest blocking device. A seat cushion frame can be pivoted between a sitting position and a stowing position, whereby said pivot movement is coupled with the folding movement of the back rest over a bar having protection against excessive travel, in order to prevent damage due to careless positioning of the seat despite blocking of the back rest.

The drawback in such seats is, however, that the user becomes aware initially only during folding forward, whether the seat in a reliable rear position is or not and consequently, if necessary, must first fold the back rearwards and must then move the seat frame into the rear option, in order to be able to again move the seat forward. Furthermore, generally out of safety considerations, an additional locking of the seat part to the seat frame is required, which must then be released by means of an additional operating device. Also, neither the seat part or the rest nor the rest can be unblocked from the rear; that is, by way of the trunk.

A seat assembly having two rest parts is known from Toyota Yaris, wherein in the separation plane between the rest parts a handle is arranged that can be operated from the front and the rear, by means of which the one of the rests can be unlatched.

DE 100 55 432 A1 discloses a motor vehicle seat, whose back rest and seat part are coupled by means of a connection member, which controls the movement of the back rest relative to the seat part. The seat part is longitudinally adjustable relative to the vehicle floor by means of rails, whereby, in order to do this, a locking member must be unlocked by manual lifting movement of a rail release handle.

The object of the invention is to provide a vehicle seat that can be adjusted with relatively little effort and wherein the damages by careless folding forward of the back rest into a forward position of the seat part is avoided. Accordingly and advantageously, adjustment of the vehicle seat from the rear is possible.

According to the invention a forward grip for releasing the seat longitudinal latching is provided, which can be operated by a user seated in the seat and, further a rear handle that can be operated from the vehicle trunk—a lanyard, for example—for releasing the seat longitudinal latching and the rest locking uniting. Advantageously, a further handle is arranged, for example, on the side of the rest locking unit for unlatching the rest locking unit by the user sitting in the seat. In this fashion, a high level of user comfort and convenience is achieved, since for enlarging the cargo space the user can achieve a complete displacement of the motor vehicle seat from the vehicle trunk zone. According to the invention, at least three functions are achieved by the rear handle, namely: the unlocking of the seat longitudinal latch; a verification, whether the seat is in a rearward position that will allow the folding forward of the back rest, and an unlocking of the rest locking unit. Also the rear positioning of the released seat part can be achieved from a forward to a rearward positioning by means of the handle, so that a complete repositioning of the seat b means of a continuous course of movement of the rear handle, whereby the back rest can automatically fold into the functional position and be locked therein.

The unlocking system for the seat longitudinal latching and rest locking unit can preferably be connected to a device transmitting pulling but not pressure forces such as, for example, a cable, in order to prevent releasing the rest locking unit upon operation of the forward handle.

The folding forward of the back rest into the forward position can be prevented, in that a further pivoting movement of the adjustment lever, after unlocking the seat longitudinal latching, is prevented by a stop. In this case, the adjustment lever can slide or roll with a bolt onto the stop, until it is released for the further pivoting movement for release of the rest locking unit.

In order to prevent a excessive lift of the forward unlocking device by the rear handle when unlocking the rest locking unit, the forward unlocking unit has an overtravel protection device, whose spring force is greater than the required unlocking force.

The invention will be more completely described in the following with reference to the annexed drawings and an embodiment, wherein:

BRIEF DESCRIPTION OF THE DRAWINGS

FIG. 3 represents an unlocking of the seat longitudinal latching from the rear in a forward position of the seat;

FIG. 4 represents the seat displaced into an allowable rear position relative to FIG. 3;

FIG. 5 represents a later unlocking of the back rest;

FIG. 6 represents the motor vehicle seat locked in the functional position;

DETAILED DESCRIPTION

Figure 1:
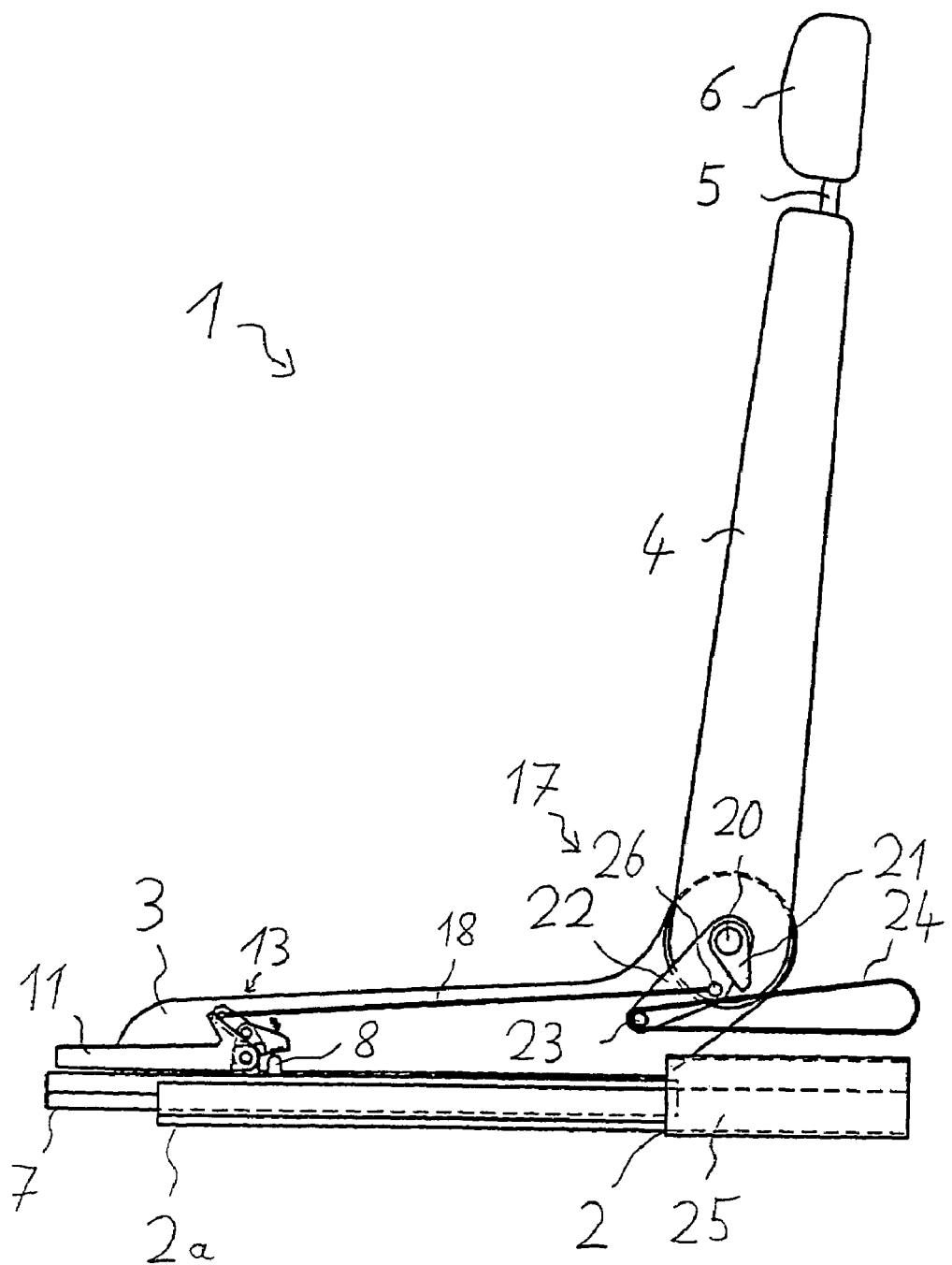
FIG. 1 represents a side view of a motor vehicle seat according to the invention in the seated position with locked seat longitudinal latching and rest locking unit.

A motor vehicle seat 1 has a seat frame 2, a seat part 3 situated opposite to the seat frame and which can be adjusted longitudinally and a back rest 4 that can be folded relative to the seat part 3, on which a head rest 6 is mounted by means of head rest bars 5. The seat part 3 is guided longitudinally adjustably with upper rails 7 on lower rails 2a of the seat frame 2.

Figure 8:
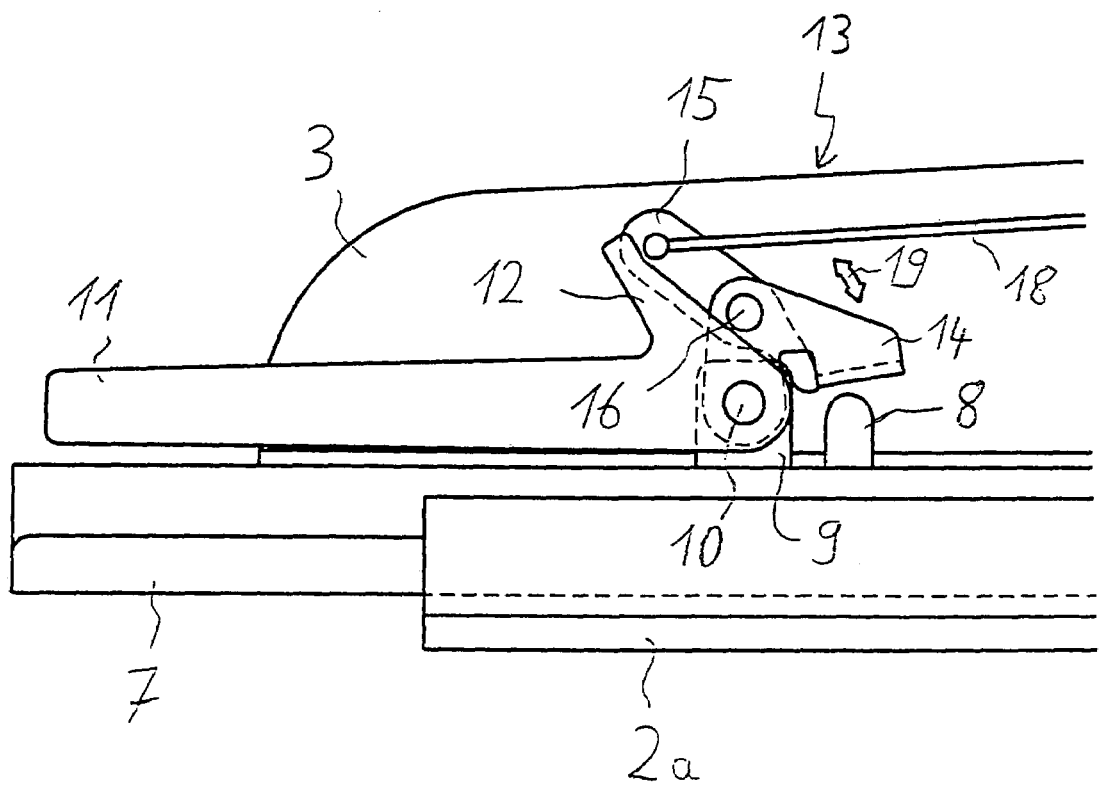
FIG. 8 represents a cut-out view from FIG. 1 with the unlocking unit for the seat longitudinal latching.
Figure 9:
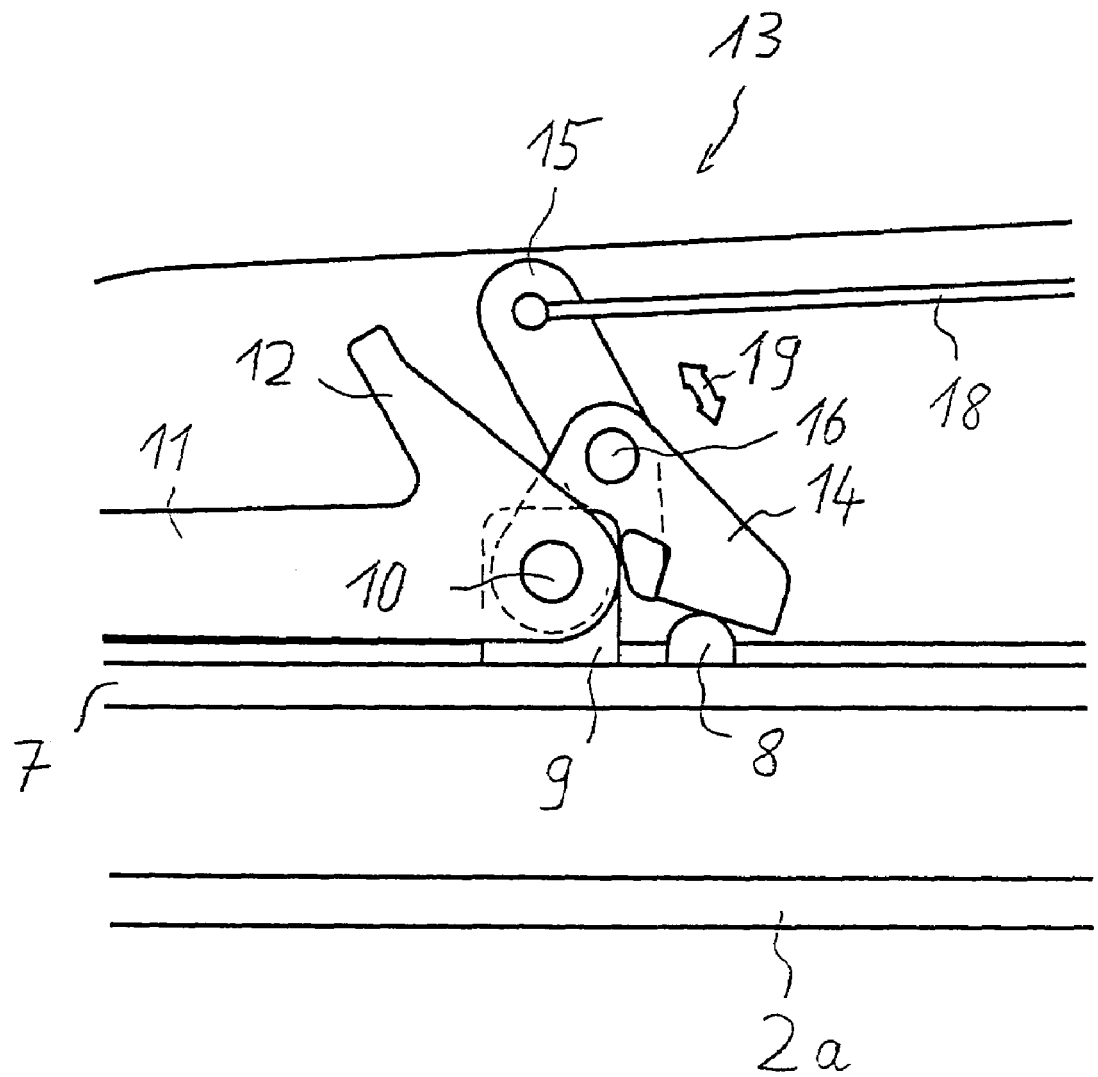
FIG. 9 represents a cut-out view from FIG. 3 with the unlocking unit for the seat longitudinal unlocking.
Figure 10:
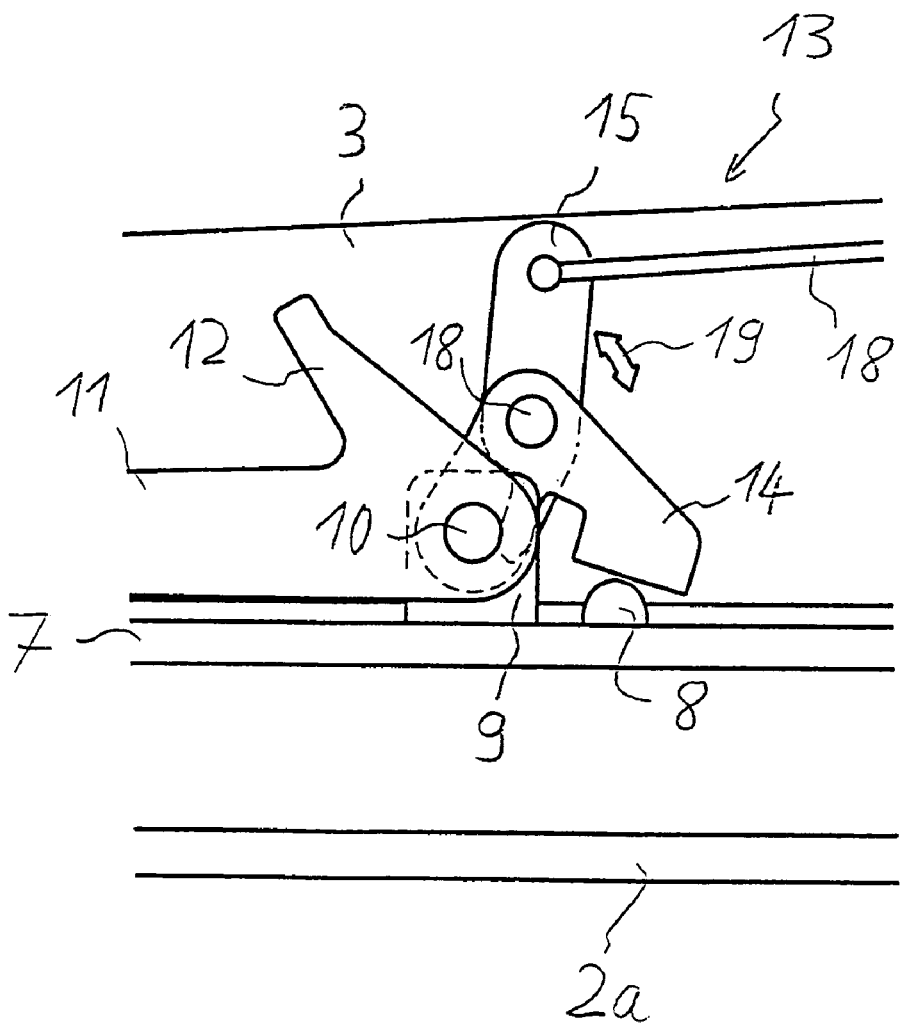
FIG. 10 represents a corresponding cut-out view from FIG. 5.

The lower rails 2a are locked by means of a locking finger 8 on the upper rail 7 of the seat part 3, whereby the locking finger 8 is pressed in by an unlocking unit 13 for releasing. As can be seen in particular in the sections of FIG. 8 to 10, the unlocking unit 13 has, mounted on a bearing block 9 of the upper rail 7 in a pivot point 10, serving as the unlocking lever 11 for the forward handle with a lever arm 12, a lower bracket 14 and an upper bracket 15 mounted in the pivot point 10, which is mounted in a pivot point 16 in the lower bracket 14 and connected with the lower bracket 14 via a overtravel spring 19 (not shown in detail). Upon pivoting of the unlocking lever 11 the upper bracket 15 and the lower bracket 14 is pivoted by the lever arm 12, so that the locking finger 8 is depressed. In addition, a cable 18 is fastened to the upper bracket 15, which can pivot the upper bracket 15 for unlocking the locking finger 8. The spring forces of the overtravel spring 19 and a spring (not shown) of the locking finger 8 are arranged, so that the overtravel system does not respond upon unlocking the locking finger 8.

Figure 7:
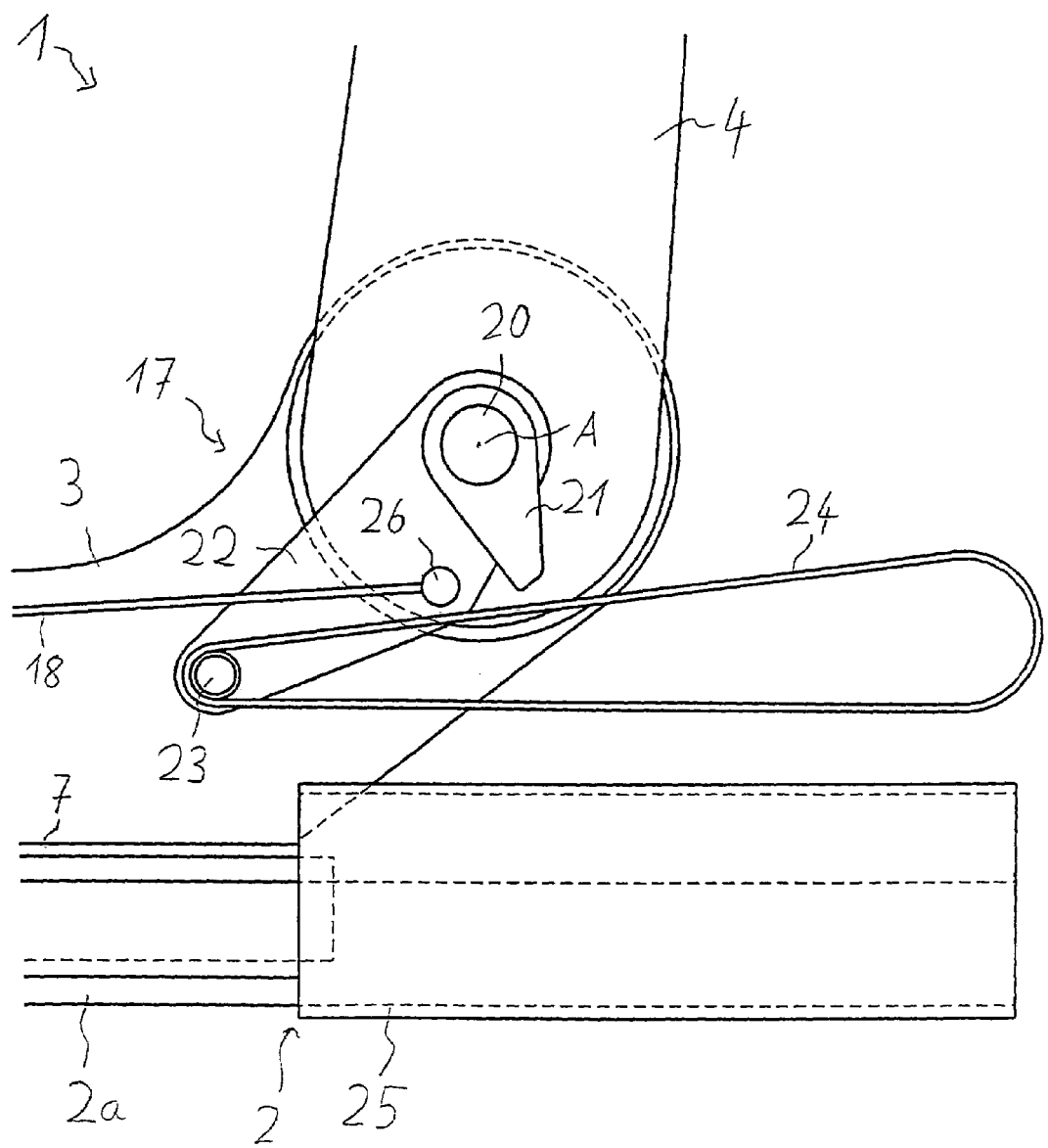
FIG. 7 represents a section of the zone of the back rest adjustment of the seat of FIG. 1.

The cable 18 is in addition fastened to a rear unlocking unit 17 for the rest blocking unit. The unlocking unit 17 shown in detail in FIG. 7 has an unlocking lever 21 mounted in the axis of rotation A of the back rest 4, with which a rest blocking unit 20 (not shown in detail), configured as a flap cover, can be released. On the one hand, the releasing lever 21 can be directly operated by the user in known fashion. In addition, an adjusting lever 22 pivotable around a back axis 20 is provided with a bolt 26, which upon pivoting of the adjusting lever 22 reaches the unlocking lever 21 after unobstructed lifting and then pivots same for unlocking. The bolt 26 can preferably be used also for connecting the cable 18. A releasing loop is places on the adjusting lever 22 on a roller preferably provided with a bolt 23, said loop extending up to the vehicle trunk behind the motor vehicle seat 1.

Figure 2:
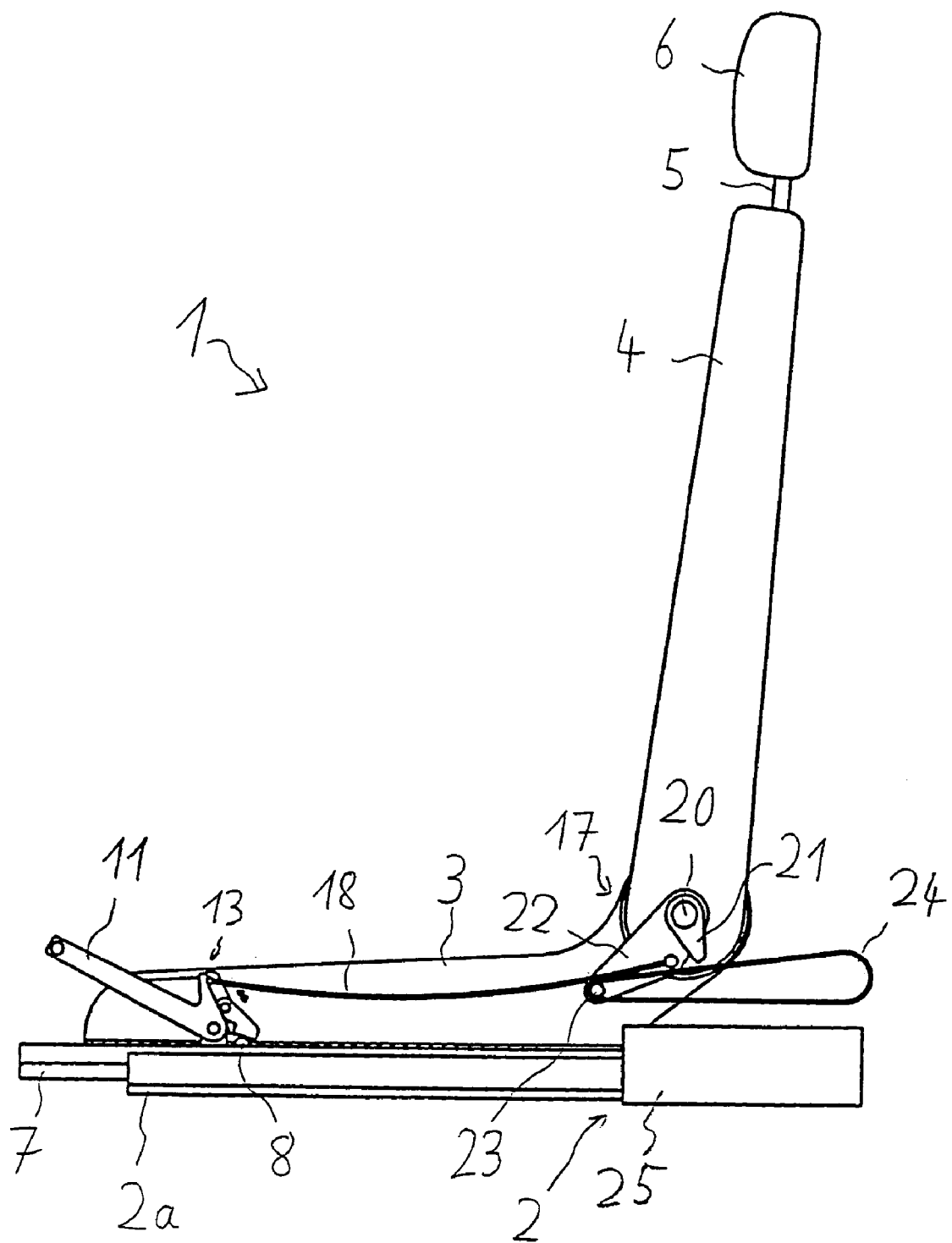
FIG. 2 represents a front view of the seat longitudinal adjustment after unlocking.

If the unlocking lever 11 for the seat longitudinal latching is operated from the seat position of the motor vehicle seat 1 of FIG. 1, as shown in FIG. 2 the upper bracket 15 and the lower bracket 14 is pivoted and accordingly the locking finger 8 is pressed in, so that the motor vehicle seat 1 can, in known fashion, be longitudinally displaced using the upper rail 7 on the lower rail 2. The cable 18, which merely transmits tractional force sags and does not displace the rear unlocking unit 17.

If the unlocking loop 24 is pulled from the vehicle trunk end, initially the adjusting lever 22 is accordingly pivoted, whereby the projection 26 does not yet contact the unlocking lever 21 in the unobstructed lifting. The pivoting adjustment lever 22, by means of the cable 18, the upper bracket 15 of the forward unlocking unit 13, so that it initially urges the upper bracket 15 and, via the coupling of the initially rigid spring 19, also the lower bracket 14 against the locking finger 8, whereby according to FIG. 3 the locking finger 8 is pressed in. Consequently, the seat longitudinal latching is released and the rest blocking unit is further locked.

Figure 3:
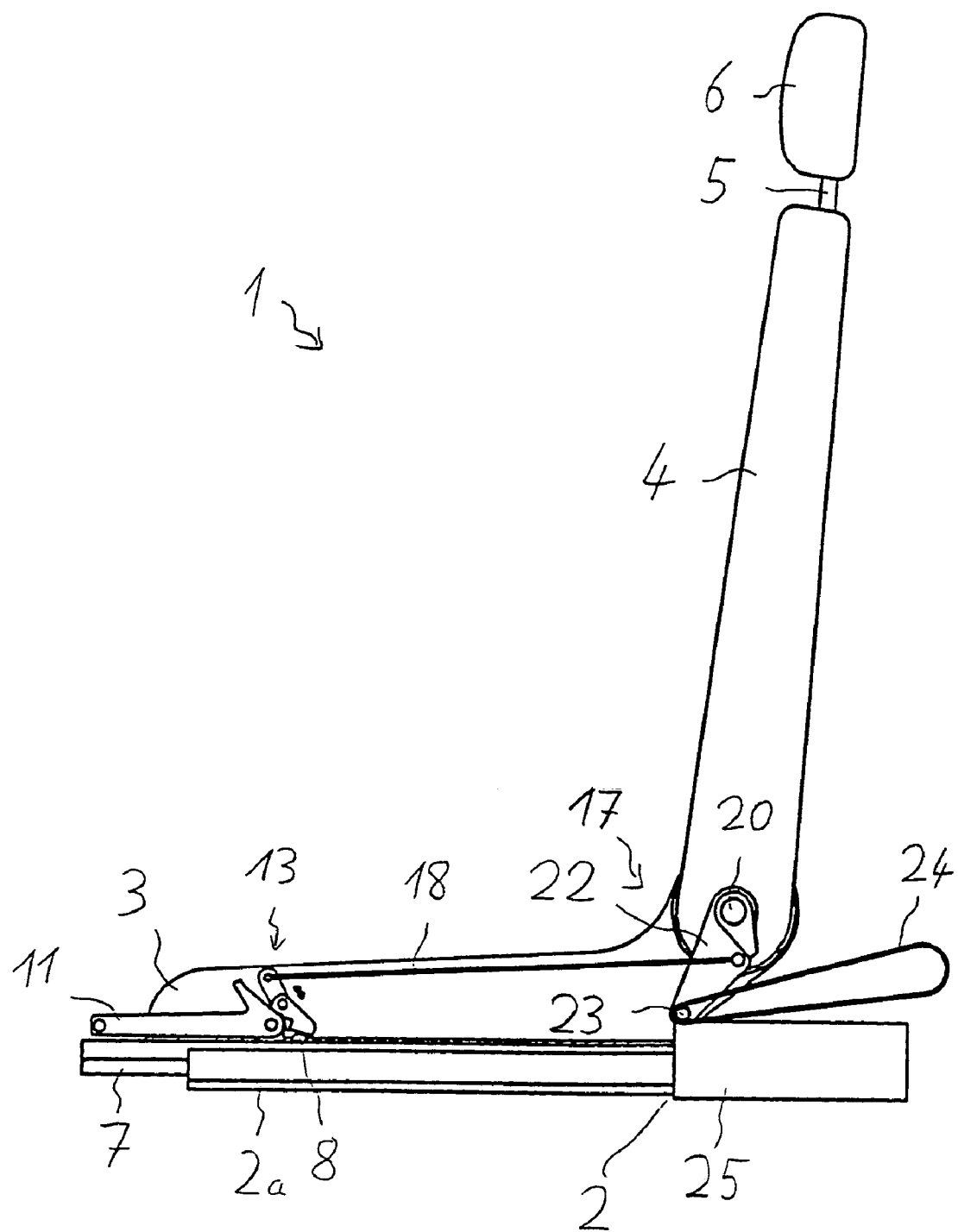
FIGS. 3–6 represent a complete displacement of the motor vehicle seat of FIG. 1 from the sitting position to the functional position as viewed from behind.

In the forward position of the seat part 3 represented in FIG. 3, upon further operation of the loop 24 a folding forward of the back rest 4 on the basis of a possible collision of the back rest 4 and in particular the head rest 6 with the front seat is impermissible. As shown in FIG. 3, the bolt 23 impacts against the blocking plate 25 acting as a stop and accordingly blocks the further pivoting of the adjustment lever 22. Upon further pulling of the release loop 24 the seat part together the back rest 4 is drawn rearward on the seat frame 2, whereby the bolt 23 rolls with a roller onto the stop plate 25.

Figure 4:
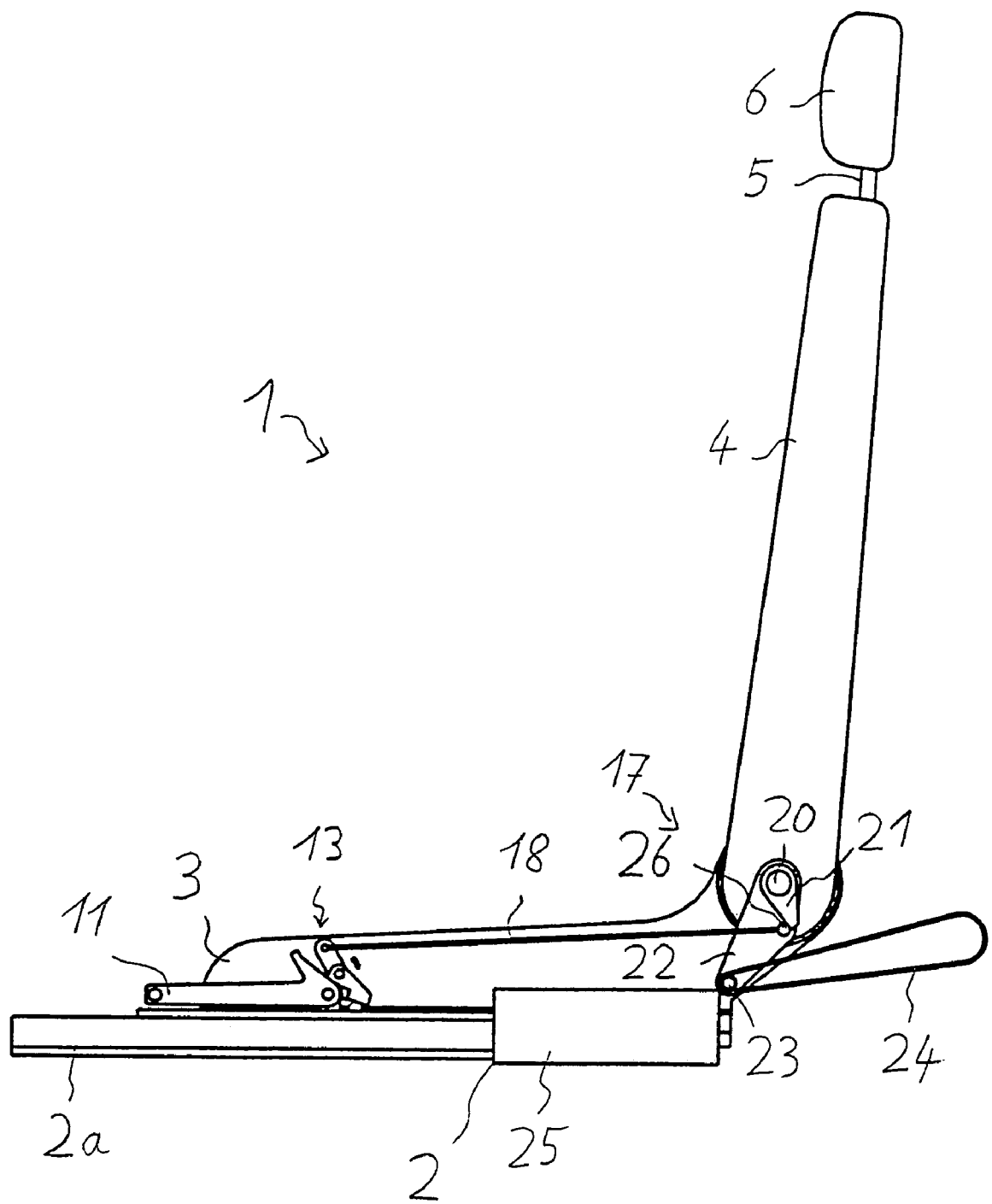
Figure 5:
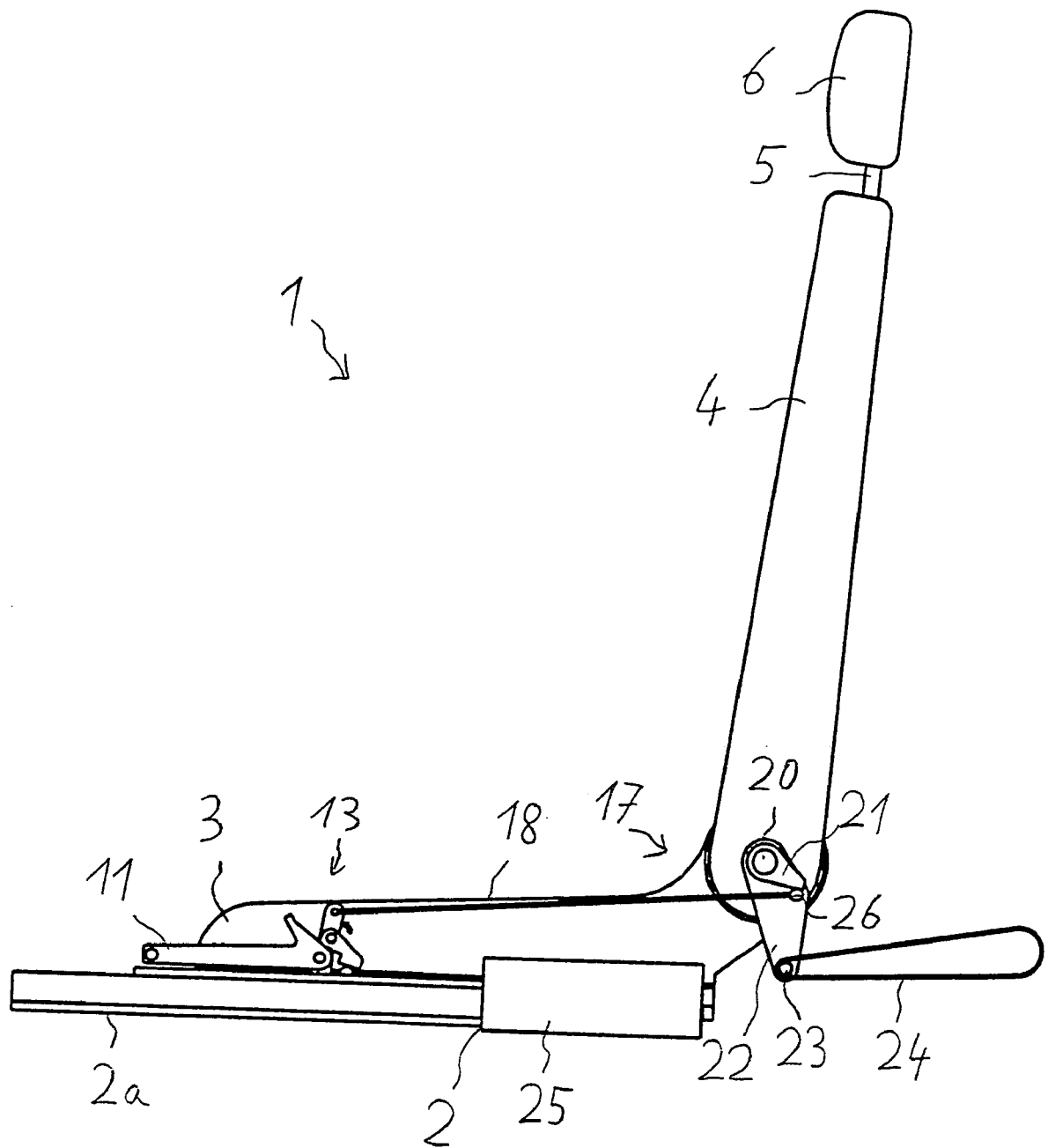
Figure 6:
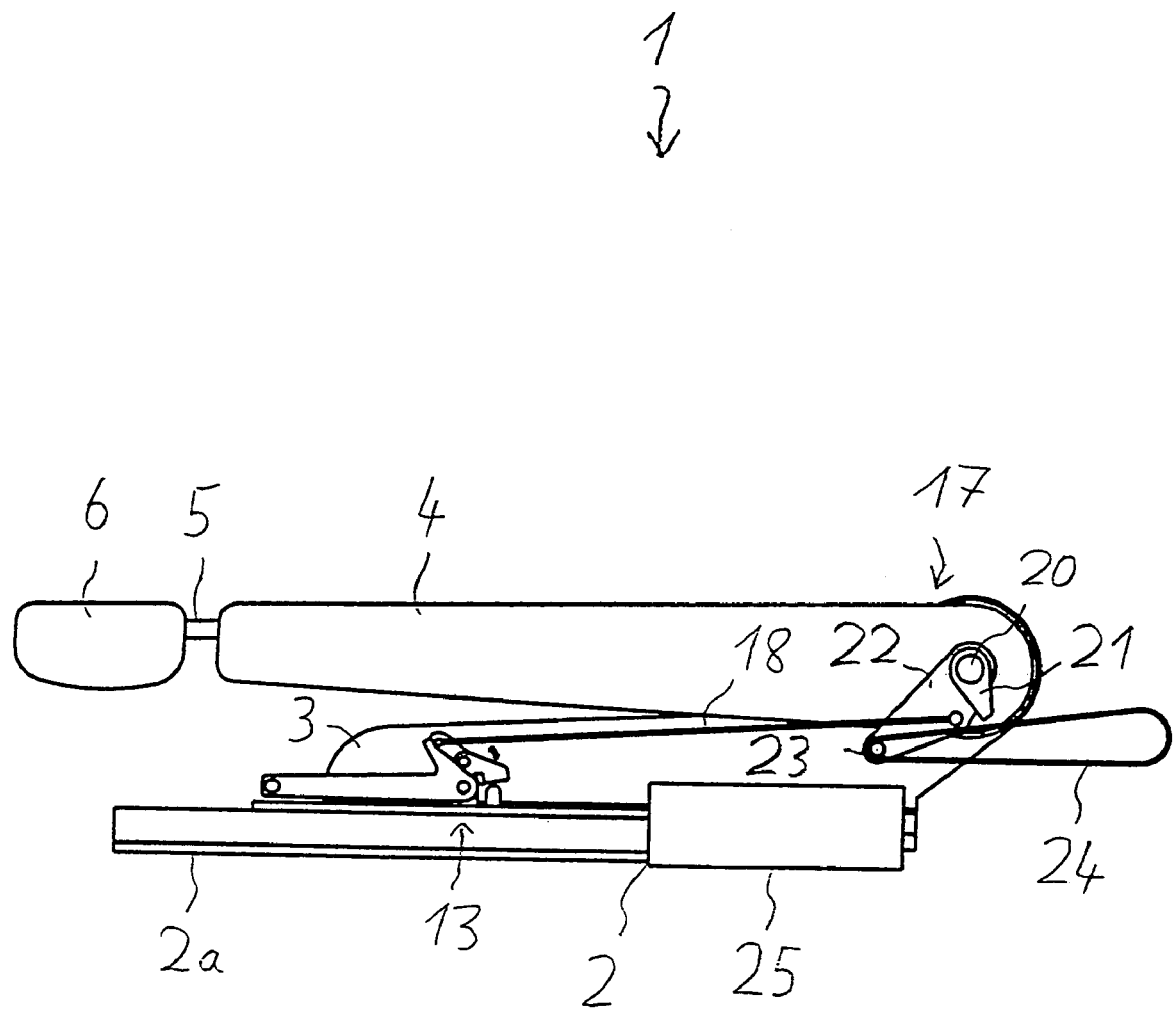

In the position shown in FIG. 4, the bolt 23 reaches the trailing edge of the stop plate 25, so that on further pulling on the release loop 24 the adjustment lever 22 can be further pivoted. In this case the bolt 26 presses against the release lever 21 and pivots same, so that according to FIG. 5 the rest blocking unit 20 is released. The spring-biased back rest 4 pivots, as shown in FIG. 6, forwards in the functional position. If accordingly thereafter the release loop 24 is released, the overtravel 19 spring relaxes, so that the release unit 13 again releases the locking finger 8 and the seat longitudinal latching unit locks. Because the adjusting lever 22 is pivoted forwards, the rest blocking unit 20 also re-locks, so that the motor vehicle seat 1 assumes a locked functional position. A reverse movement in the sitting position of FIG. 1 can be done by pulling on the release loop 24 and subsequent folding up of the back rest 4.

We claim:

1. A motor vehicle seat for a rear row of seats of a motor vehicle, which can be adjusted between a sitting position and a functional position, having:
    a seat part (3) that can be adjusted relative to a seat frame (2);
    a back rest (4) foldable relative to the seat part (3);
    a front handle (11) for unlocking a seat longitudinal locking unit (8) of the seat pan (3);
    a rear handle (24) that can be operated from position behind the back rest (4), whereby the seat longitudinal locking unit (8) of the seat part (3) can be unlatched, and wherein it can be verified, whether the seat part (3) is in a rear position; and wherein the seat pan (3) can be displaced into the specific position after its unlatching; and wherein if the seat pan (3) is in the rear position, a rest blocking unit (20) of the back rest (4) can be unlatched characterized in that when the specific position is a rearward position of the seat part (3); the unlatchable blocking of the seat part (3) in the rearward position by means of the rear handle is a rest blocking unit (20) of the back rest (4), and the motor vehicle seat can be displaced from its sitting position into its functional position by means of a movement sequence of the rear handle (24) comprising a plurality of sequential partial movements; and,
    further wherein when the specific position is a rearward position of the seat part (3); the unlockable blocking by means of the rear handle in the rearward position of the seat part (3) is a rest blocking (20) of the back rest (4), and the motor vehicle seat can be shifted from its sitting position into its functional position by means of a movement series consisting of a plurality of sequential partial movements of the rear handle (24); and,
    further wherein in a first partial movement, the seat longitudinal locking (8) of the seat part (3) can be unlatched, in the case of a blocking of a subsequent partial movement it can be identified that the seat part (3) is not in the rearward position, the seat part (3) can be displaced into the rearward position in a subsequent partial movement, and in a subsequent partial movement, the backrest (4) can be unblocked, and further characterized in that by means of the rear handle (24) an adjustment lever (22) can be operated for unlatching the rest blocking (20) and a traction force transmitting device (18) on the adjustment lever (22), a cable (18), for operating an unlatching unit (14, 15, 16, 19) is used for the seat longitudinal locking (8).

2. The motor vehicle seat according to claim 1, characterized in that upon pivoting the adjusting lever (22) after an unobstructed lifting an unlatching means (21) for the rest blocking (20) can be operated by means of a bolt (26) arranged on the adjustment lever (22).

3. The motor vehicle seat according to claim 1, characterized in that the unlocking means (21) for the rest blocking unit (20), in particular a release lever (21), can be further operated by a user sitting on the motor vehicle seat.

4. The motor vehicle seat according to one of claim 1, characterized in that the unlocking unit (14, 15, 16, 19) has, for the seat longitudinal locking (8), an overtravel protection device for the overtravel occurring at the time of the partial movement of the rear handle (24) for unlatching of the rest blocking unit (20).

5. The motor vehicle seat according to claim 4, characterized in that the overtravel protection device has a lower bracket (14) acting on the locking unit (8) and an upper bracket (15) operating the lower bracket (14) by means of an overtravel spring (19), whereby the upper bracket (15) can be operated both by the traction—transmitting unit (18) and by the front handle (11).

6. The motor vehicle seat according to claim 5, characterized in that the lower bracket (14) on the seat part (3) is linked preferably to a bearing block (9) fixed to the seat and the upper bracket (15) is linked in the lower bracket (14).

7. The motor vehicle seat according to claim 5, characterized in that the reverse moment created by the overtravel spring (19) between the lower bracket (14) and the upper bracket (15) is greater than that unlocking moment required for the unlatching of the seat longitudinal locking (8).

8. The motor vehicle seat according to one of claim 1, characterized in that the seat frame (2) has a stop plate (25), which blocks a pivot movement of the adjustment lever (22) and releases in the rear position.

9. The motor vehicle according to claim 1, characterized in that the rear handle (24) is a grip unit that can be rearwardly pulled comprising a loop (24).

10. The motor vehicle seat according to claim 9 characterized in that the loop (24) is set around a bolt (23) of the adjustment lever (22), said bolt sliding or rolling on the stop plate (25).

11. The motor vehicle seat according to claim 1, characterized in that the back rest (4) is spring-biased in the functional position.

12. The motor vehicle according to claim 1, characterized in that the rest blocking (20) and the seat longitudinal locking (8) are lockable in a functional position, preferably automatically lockable.

* * * * *